(12) United States Patent
Mittal et al.

(10) Patent No.: US 7,730,088 B2
(45) Date of Patent: Jun. 1, 2010

(54) QUERIABLE HIERARCHICAL TEXT DATA

(75) Inventors: Sumit Mittal, Uttar Pradesh (IN);
Biplav Srivastava, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/531,859

(22) Filed: Sep. 14, 2006

(65) Prior Publication Data
US 2008/0071814 A1    Mar. 20, 2008

(51) Int. Cl.
*G06F 7/00* (2006.01)
*G06F 17/30* (2006.01)

(52) U.S. Cl. .................. 707/778; 707/797; 707/829
(58) Field of Classification Search ........................ None
See application file for complete search history.

(56) References Cited

U.S. PATENT DOCUMENTS

| | | | |
|---|---|---|---|
| 5,153,831 | A | 10/1992 | Yianilos |
| 5,737,733 | A | 4/1998 | Eller |
| 5,930,805 | A * | 7/1999 | Marquis ............... 707/201 |
| 6,122,379 | A | 9/2000 | Barbir |
| 6,154,542 | A | 11/2000 | Crandall |
| 6,950,943 | B1 | 9/2005 | Bacha et al. |
| 7,043,490 | B2 * | 5/2006 | Choy et al. ............ 707/101 |
| 2002/0019934 | A1 | 2/2002 | Ishizaki |
| 2002/0178171 | A1 | 11/2002 | Walker et al. |
| 2003/0016820 | A1 | 1/2003 | Volpert, Jr. |
| 2003/0093755 | A1 * | 5/2003 | O'Carroll ............... 715/500 |
| 2004/0034628 | A1 | 2/2004 | Numao et al. |
| 2004/0128330 | A1 | 7/2004 | Chu |
| 2005/0278338 | A1 * | 12/2005 | Todorova et al. ........ 707/10 |
| 2006/0236224 | A1 * | 10/2006 | Kuznetsov et al. ....... 715/513 |

OTHER PUBLICATIONS

Goh, Eu-Jin; "*Secure indexes for efficient searching on encrypted compressed data*", Cryptology ePrint Archive, Report 2003/216, 2003.
Ferragina, P.; Luccio, F.; Manzini, G.; and Muthukrishnan, S.; "*Compressing and Searching XML Data Via Two Zips*", Proc. Of World Wide Web Conference, 2006.
Tolani, P. and Haritsa, J.R.; "*XGrind: A Query-friendly XML Compressor*". In Proceedings of 18th IEEE International Conference on Data Engineering, pp. 225-234, 2002.
Quinhua Zou, Shaorong Liu, Wesley W Chu; *Ctree: a compact tree for indexing XML data*, Proceedings of the 6th annual ACM international workshop on Web information and data management, Nov. 12-13, 2004, Washington DC, USA.
Vojtiech Toman. Syntactical Compression of XML Data. caise04dc.idi.ntnu.no/CRC_CaiseDC/toman.pdf.

* cited by examiner

*Primary Examiner*—Greta L Robinson
*Assistant Examiner*—James J Wilcox
(74) *Attorney, Agent, or Firm*—Gibb I.P. Law Firm, LLC

(57) ABSTRACT

There is disclosed a method, apparatus and computer program product for generating a queriable text. User role map information is applied to the source hierarchical text. The role mapped text is separated into a structure component and a content component. The content component is compressed. A method for processing intermediate and original form query also is disclosed.

15 Claims, 14 Drawing Sheets

Mapping of Schema Tokens
*(Schema Token Function)*

Token 0 – dblp

Token 1 – article

Token 2 – title

Token 3 – date

Token 4 – author

Token 5 – thesis

*User Role Map*

Role: SeeAll
Token 0 – dblp
Token 1 – article
Token 2 – title
Token 3 – date
Token 4 – author
Token 5 – thesis Role: SeeOnlyArticles
Token 0 – dblp
Token 1 – article
Token 2 – title
Token 3 – date
Token 4 – author

Fig. 8

Content Stream:
ABC 1996 March John BCD 1997 April Sam XYZ Sumit BC Biplav GH 1996 May John

Fig. 11

QUERIABLE HIERARCHICAL TEXT DATA

FIELD OF THE INVENTION

This invention relates to hierarchical text data, and particularly to a representation of such data that allows queries to be performed. The queries can be of the source (i.e. original) text itself or an intermediate form of the original text.

BACKGROUND

An example of hierarchical text data is an XML document. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure. Physically, the document is composed of units called entities. An entity may refer to other entities to cause their inclusion in the document. A document begins in a "root" or document entity. Logically, the document is composed of declarations, elements, comments, character references, and processing instructions, all of which are indicated in the document by explicit markup. An attribute provides more information about elements, often giving information that is not part of the data itself.

Work has previously been done on the compression of XML documents: see for example H. Liefke and D. Sciciu, *An efficient compressor for XML data*, in Proc. 2000 ACM SIGMOD Conference, pages 153-164, 2000. This work describes a tool, called XMill, for compressing XML data. XMill incorporates various existing and user defined compressors to enable data type specific compressors, e.g., numbers, strings, enumerated types.

One known compression approach also has considered enabling queries on a subset of compressed documents: P. Tolani and J. R. Haritsa, *A query-friendly XML compressor*, Proc. 18th IEEE International Conference on Data Engineering, pages 225-234, 2002. But while this approach enables querying of the compressed document, but there is no notion of encryption (thus, no decryption either).

There is also a recent work that delves into the problems of compression, navigation and searching of XML documents: P. Ferragina, F. Luccio, G. Manzini and S. Muthukrishnan, *Compressing and Searching XML Data Via Two Zips*, Proc. Of World Wide Web Conference, 2006. However, there is again no notion of encryption (and thus no decryption either).

SUMMARY

It is an object of the present invention to provide compressed and encrypted hierarchical text data that can be queried in the original or an intermediate (i.e. compressed and/or encrypted) form.

Therefore, there is provided a method, apparatus and computer program product for generating a queriable text. User role mapping information is applied to the source hierarchical text. The role mapped text is separated into a structure component and a content component. The content component is compressed.

Preferably, the separation is achieved by building a $C^+$ tree (as herein described) for the role mapped text data.

Since the structure of the original text is preserved by the separation, queries are readily performed on the intermediate (i.e. compressed and/or encrypted) form. Selective decompression and decryption is provided by the use of the user role maps and/or a schema token.

In another form, there is provided a method for processing an intermediate form query. The method includes expanding a said intermediate form query to generate a structure component and a content component of the query, and user role information. Relevant content in a stored hierarchical text is determined using the expanded query structure. A query response is generated by matching the relevant content to the query content component for a corresponding user role.

In another form, the method for processing a query comprises expanding a query to generate a structure component and a content component of the query, and user role information. The content component of the query is compressed. The relevant compressed content in a stored hierarchical text is determined using said expanded query structure. A query response is generated by matching the relevant compressed content to the compressed query content component for a corresponding user role.

Preferably, the query structure component and said compressed content component are encrypted, and the stored text has encrypted compressed content and encrypted structure.

DESCRIPTION OF THE DRAWINGS

FIG. 8 shows a mapping of schema tokens to user roles.

FIG. 11 shows a resultant content stream.

DETAILED DESCRIPTION

Introduction

In this specification the example of XML documents is used as one form of hierarchical text data. However, the invention is applicable to any text that has a well defined structure, and for which content can be separated from the structure itself. An example is a 'netlist' representation of digital circuits. Suppose a circuit has two modules, A and B, and they have two AND gates in each. Then, the elements of the circuit can be referred to as root, M1.A, M1.B, M2.A and M2.B. Each element can have inputs and outputs.

Overview

Figure 1:
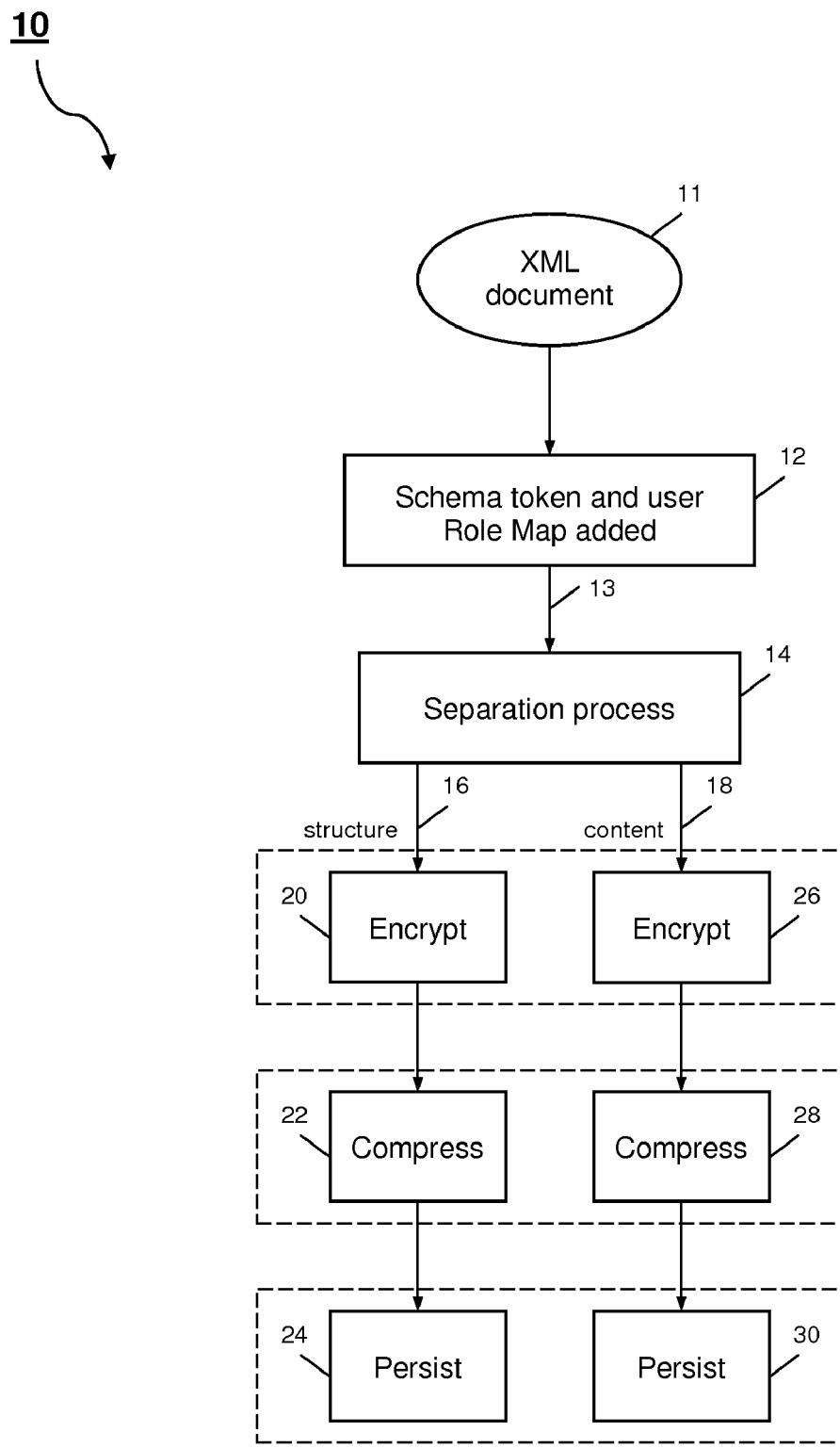
FIG. 1 is a schematic block diagram of a method embodying the invention.

FIG. 1 shows a process flow 10 for compressing and encrypting hierarchical text data, in this case an XML document. A source XML document 11 is provided. In step 12, a schema token is added to the document 11. A schema token identifies the mapping between the element names occurring in the XML document 11 to a set of tokens. These tokens can be either integers, strings etc. For example, the element name 'author' in the document in question can be assigned the token '4'. Thus compressing (and encrypting) '4' can be used instead of 'author'. This has two advantages—1) it can reduce the size of the element name itself, and 2) it helps in providing another level of security to the compressed (and encrypted) document, since this token map information would be available only to the authorised parties. User role maps or user role information itself also are added (as discussed further below).

The process flow proceeds to step 14, where the 'document+token' package 13 undergoes a process to separate the document's structure 16 and the document's content 18, in a form that preserves all text information in the original document, i.e. the document should be reproducible with the structure and content information. In one embodiment, this is achieved by a $C^+$ tree build process (described in greater detail below), that can be either order preserving or allows for re-ordering of input elements.

The structure component 16 is encrypted in step 20 and optionally compressed in step 22. The resulting encrypted (and possibly also compressed) structure is persisted in step 24. The content component 18 is encrypted in step 26, then compressed in step 28, then persisted in step 30.

It is possible for the compression steps 22, 28 to be performed in one, rather than two steps. Alternatively, the encryption steps 20, 26 may not be implemented if security of data is not a concern.

An alternative to persisting the encrypted compressed data is to transmit it in response to a query request.

Figure 2:
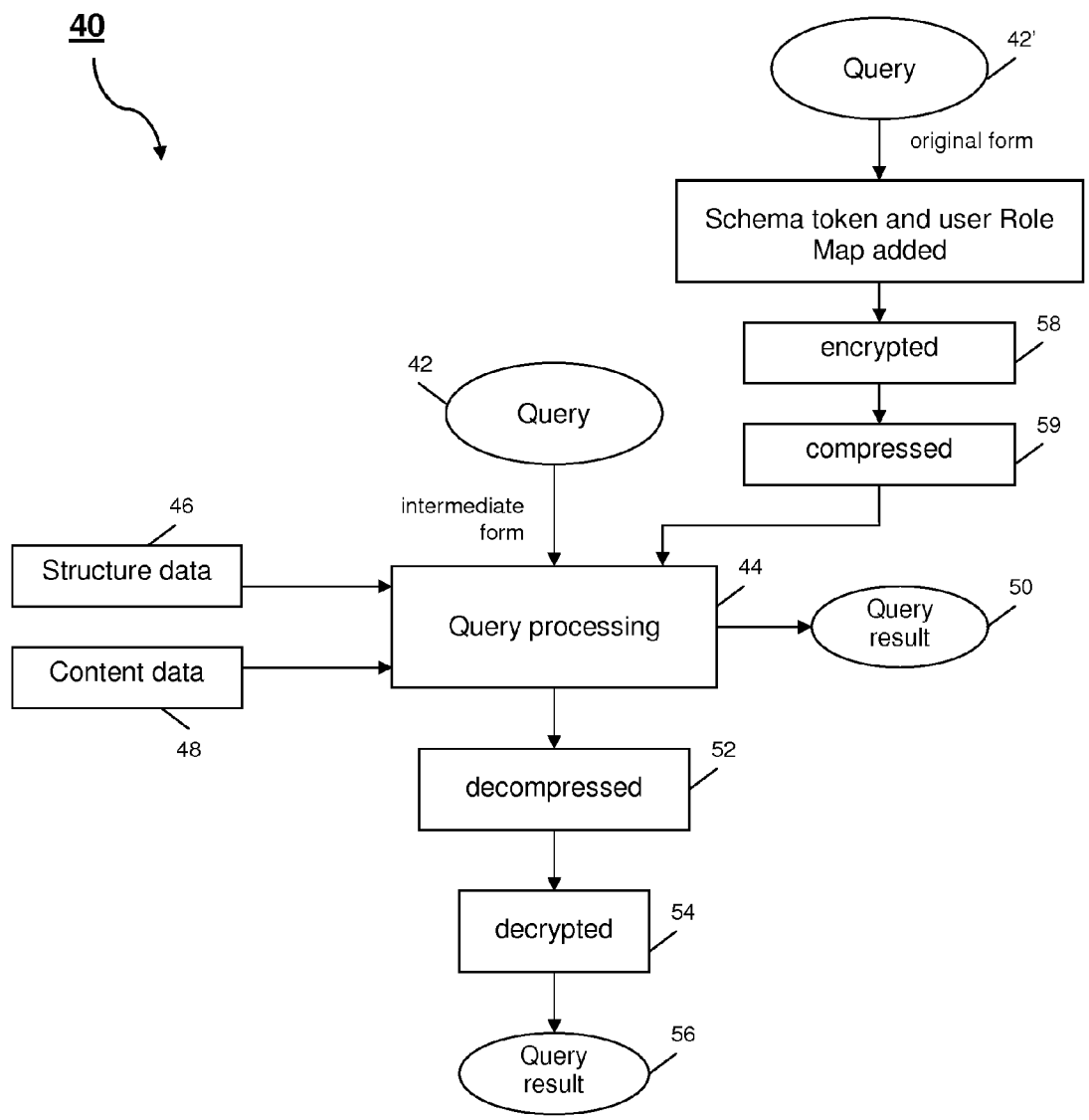
FIG. 2 is a schematic block diagram of a query method embodying the invention.

FIG. 2 shows a process flow 40, implementing a query method. A query can be either for the whole or a part of an XML document, and either in intermediate (i.e. compressed, and possibly also encrypted) form, or in original form.

In the event that the query is for intermediate form data, the query 42 is handled by a query processing step 44. The processing step 44 has as inputs the encrypted and compressed structure data 46 (represented by step 24 in FIG. 1) and the encrypted and compressed content data 48 (represented by the step 30 in FIG. 1). In step 44, the query is processed and the query result 50 generated.

In step 44 the structure 46 and content 48 have already been separated for the original XML document, and this is used to generate responses for the query. The query structure is used to determine the content to match, and then this content is matched to the one in the query to generate the response. This holds for the queries in both the original form and the intermediate form. For example, if we want to determine if there is an article with 'Biplav' as the author, first match the query structure to look for authors only under the article nodes. Each of these authors is then matched with 'Biplav' to generate the query response. Since the content and structure of both the XML document and the query are compressed and encrypted in the same manner, matching the content and the structure of the query with XML document is not affected by the compression and/or encryption.

In the event that the query is for the original form of the XML document, a query 42' is encrypted in step 58, then compressed in step 59. In step 44, the query is processed in the same manner, then the process flow passes to step 52. The result of the query processing then is decompressed in step 52 and decrypted in step 54 giving the query result 56.

Use Cases

Recalling step 12 of FIG. 1, where a schema token is added to the source XML document 11: three use cases will now be described. The first use case is where the document compression and encryption is user-independent, and the querying takes into account a user role. The second use case is a user-role specific compression and encryption. The third use case is a user-specific compression and encryption.

Figure 3:
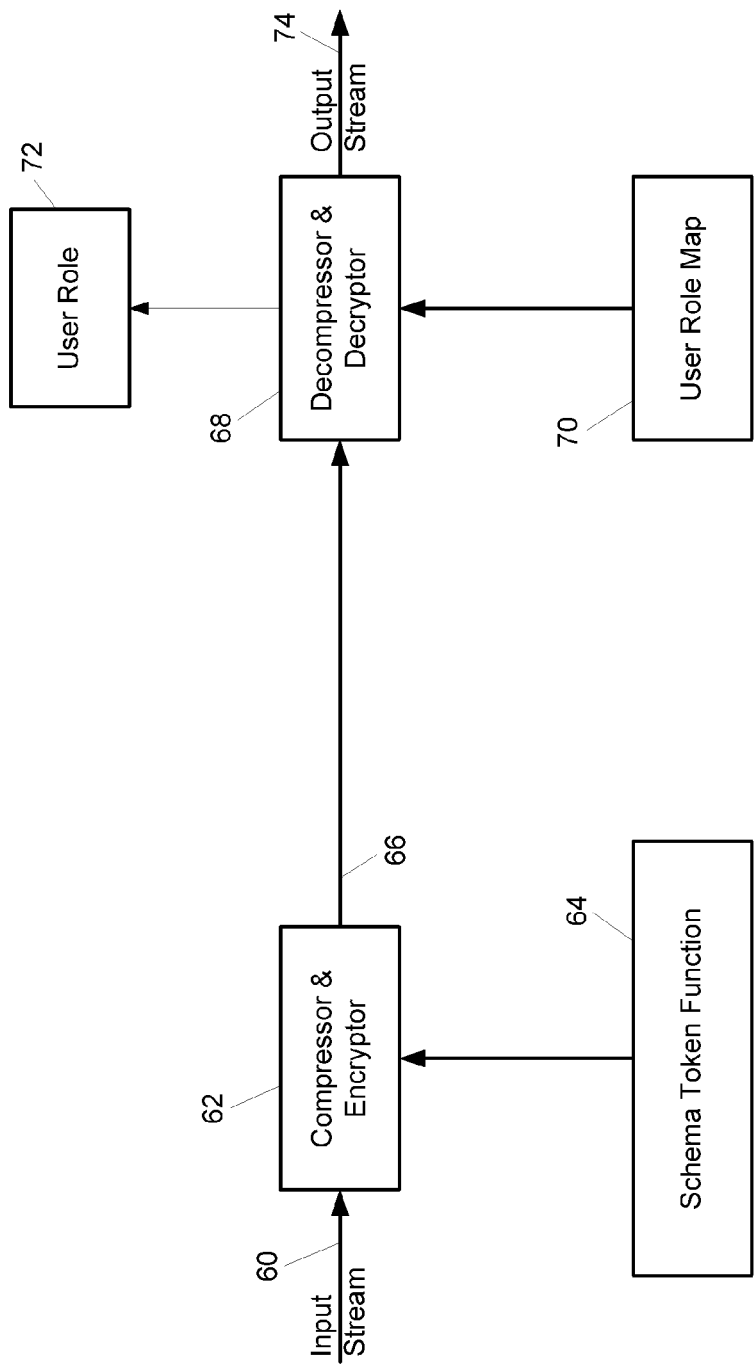
FIGS. 3 to 5 are schematic block diagrams showing use cases of document compression/encryption and related querying.

Referring then to FIG. 3 the input stream 60 represents the structure data 16 and content data 18 of FIG. 1, which is provided to a generalised compression and encryption block 62, which is equivalent to the respective encryption and compression steps 20, 22, 26, 28 shown in FIG. 1. A schema token function 64, that is generally equivalent to the addition of the schema token of step 12 of FIG. 1, is input to the compression and encryption block 62. The output 66 of the block 62 is an encrypted and compressed form of the structure and content of the source XML document 11 considering the schema token.

The decompressing and decrypting block 68 receives the output data 66. The block 68 also has as inputs a user role map 70 and a user role 72. A user role map determines what part of the document can be viewed/queried by a particular user. In essence, if a user does not have the mapping from a token to the element name that the token stands for, he cannot interpret the document corresponding to this token. For example, if the mapping from token '4' to element name 'author' is missing from the information given to the user, he cannot understand what '4' stands for. Going further, XML document structure can be divided into various parts, each part encrypted using different keys. Access to the XML document by a particular user would then be dependent on which keys he has information for. This in turn can be defined using the user role map. The last processed query is provided as an output stream 74.

Figure 4:
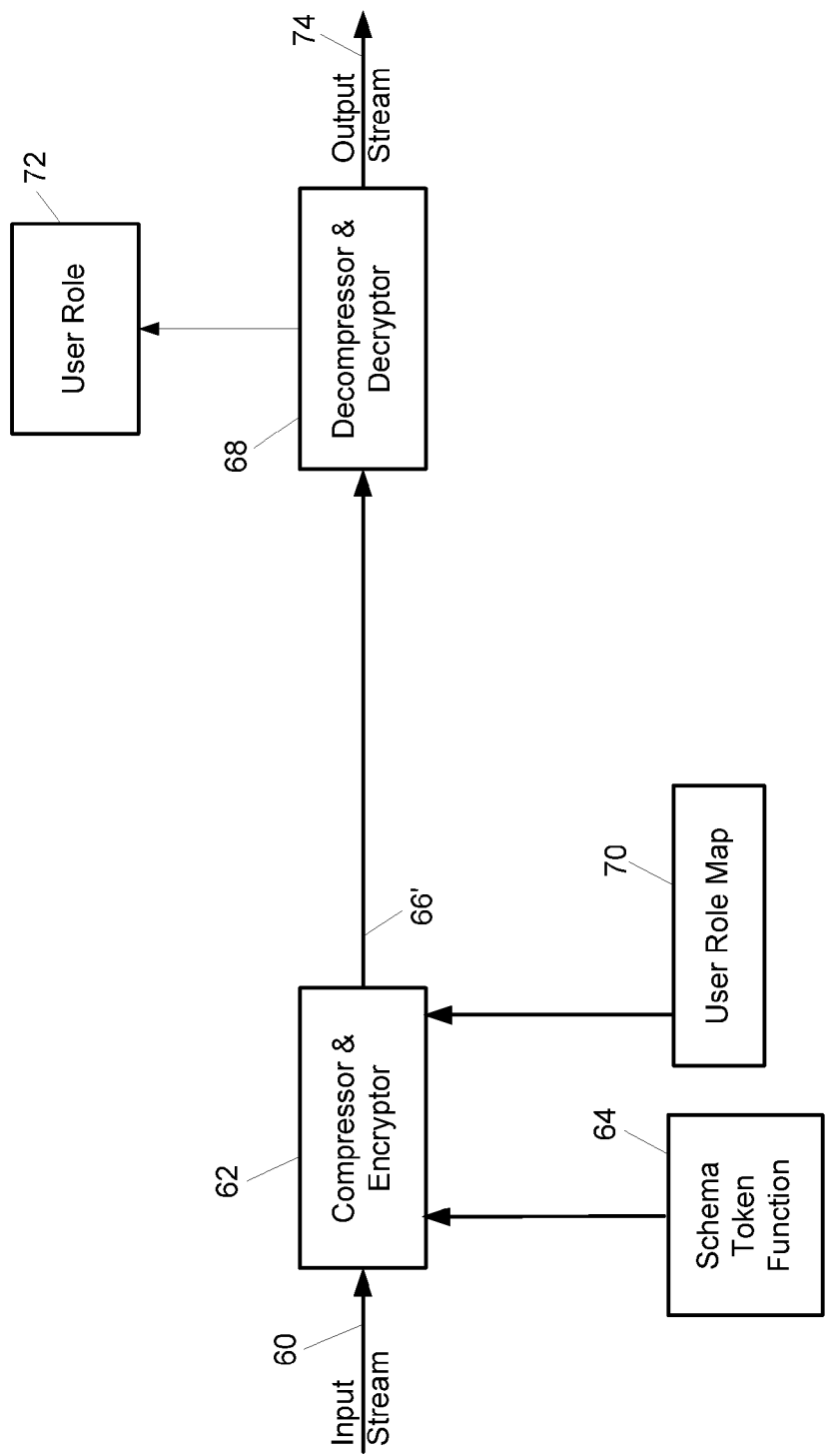

Referring now to FIG. 4, the second use case will be described. Elements and functions in common with the use case of FIG. 3 are shown using the same reference numeral. In this use case, the user role map 70 is included, together with the schema token function 64, in the encrypted and compressed outputs 66' from the compressing and encrypting block 62. In this way, only tokens compatible with a defined user role map are encrypted, compressed and sent in response to a query request. The decompressing and decrypting block 68 is aware of the input user role 72, and therefore decrypts and decompresses only documents (or parts of documents) specified by the particular use role within the user role map 70.

Figure 5:
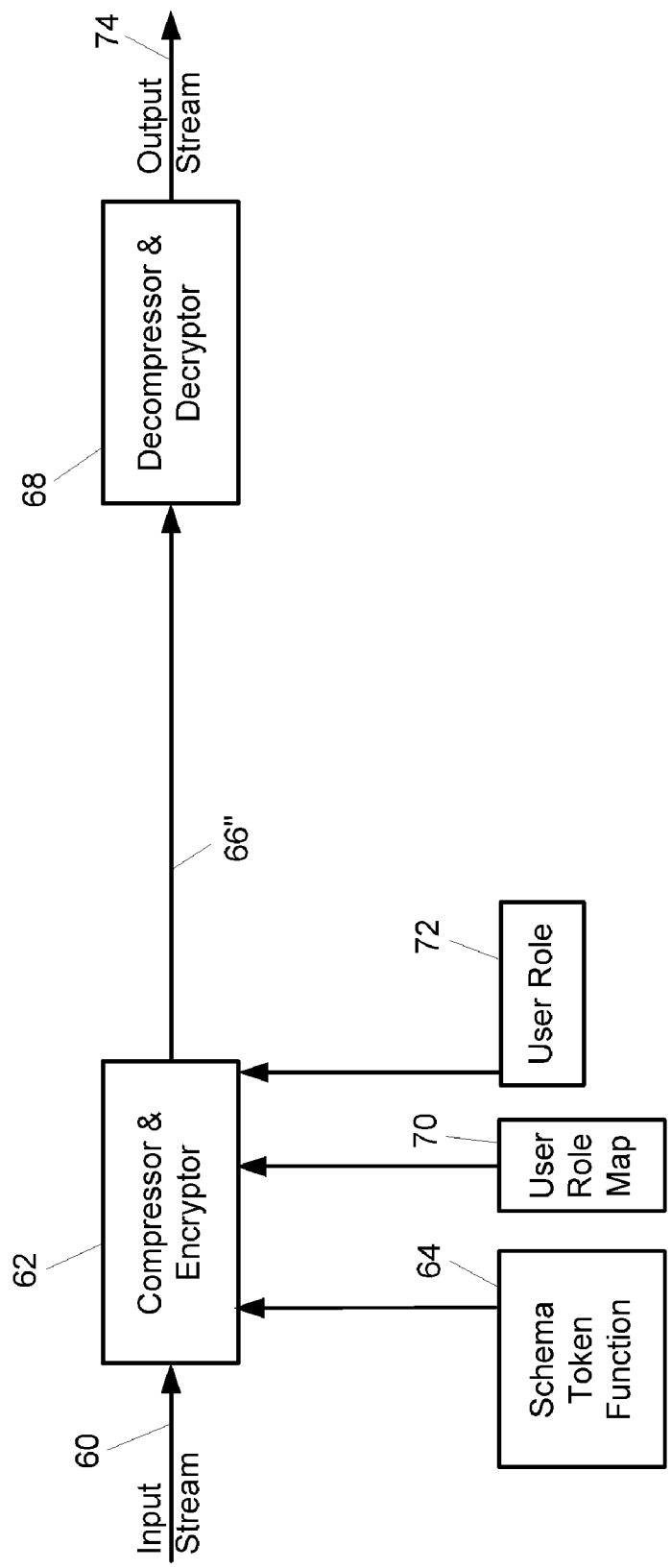

Turning to FIG. 5, the third use case is shown diagrammatically. Again, features or processes common with the other two use cases shown in FIGS. 3 and 4 use common reference numerals. In the use case of FIG. 5, all of the schema token 64, user role map 70 and user role 72 information is an input to the encrypting and compressing block 62 so that the output 66" includes only tokens to be seen by the user. Thus, the output stream 74 is role-compatible content from the input stream 60.

Specific Embodiments

Figure 6:
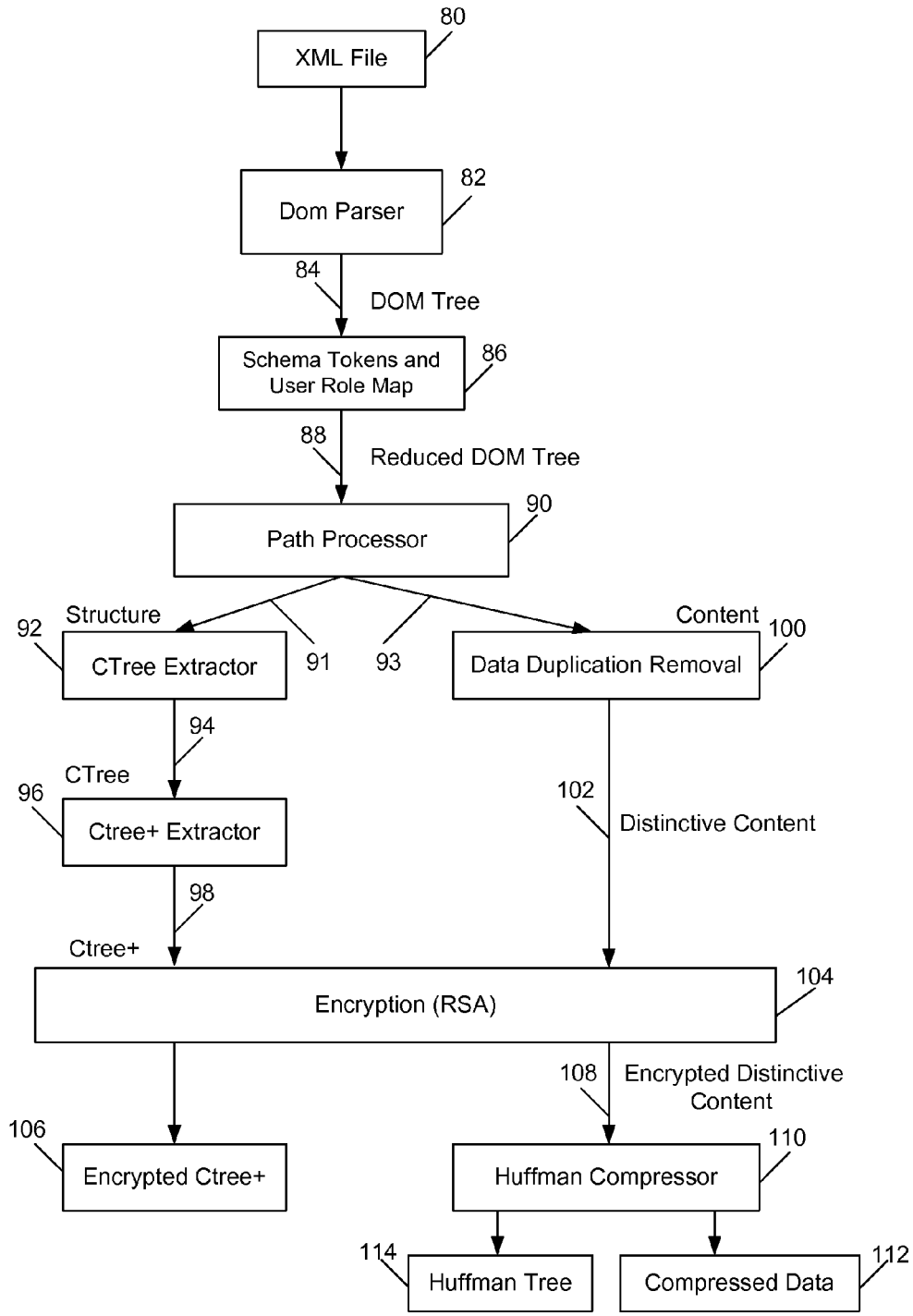
FIG. 6 is a schematic block diagram of an example encryption and compression process.
Figure 7:
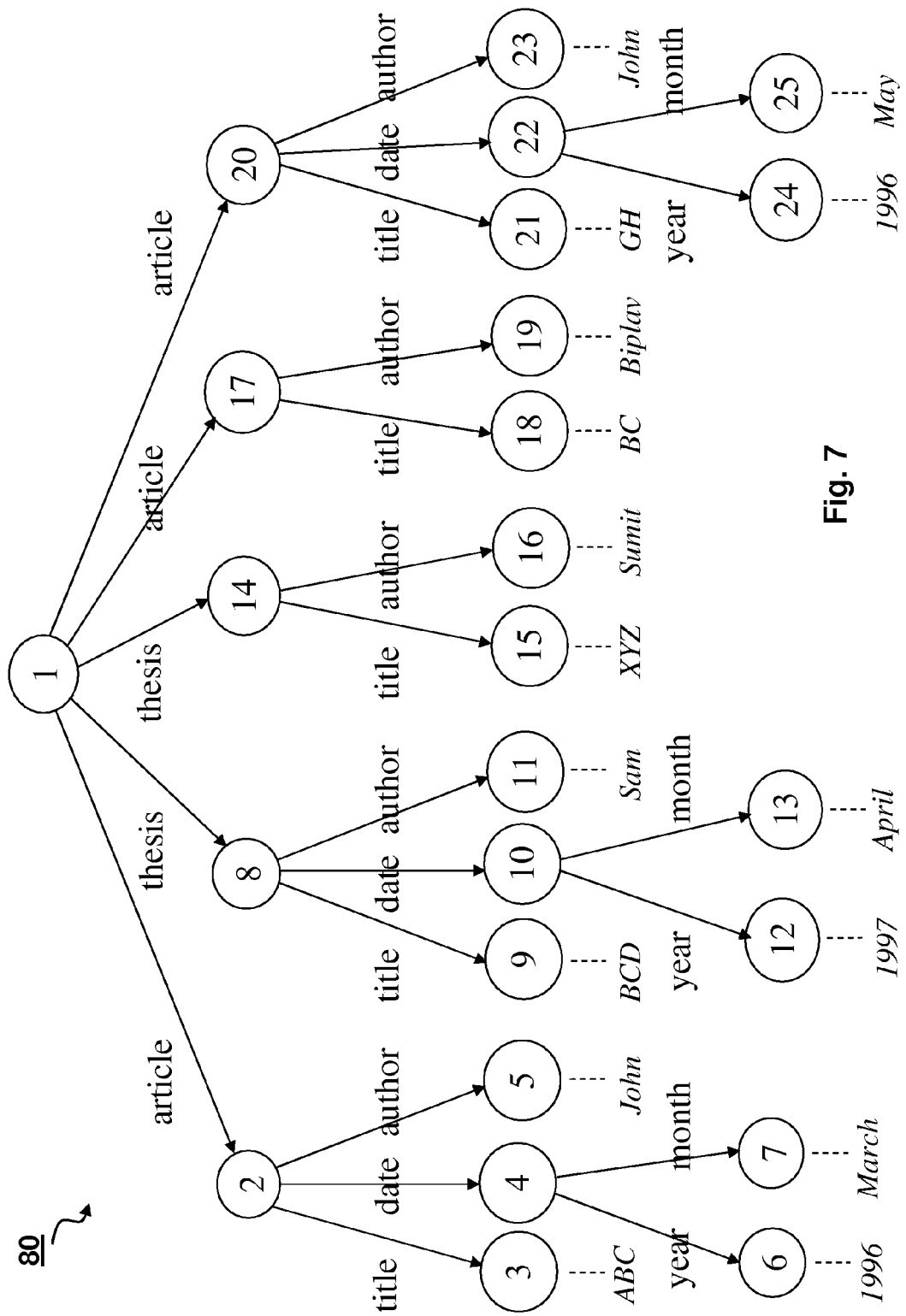
FIG. 7 shows a representative XML document.

FIG. 6 shows a specific embodiment of the generation of the encrypted and compressed form of an XML document. Accordingly, an XML file 80 is provided. The XML file 80 is input to a domain parser 82 generating a domain tree 84. FIG. 7 shows one form of such an XML file 80 represented as the domain tree 84, showing stored data entities, labelled with numerals 1 through 25, for various bibliographic items. These items can be one of article or thesis in this case. Each article or thesis can have a title, date (of publication) and the corresponding author. "Date" is an optional specification and contains a month and a year for publication.

The domain tree 84 is provided to a schema token and user role map insertion process 86 (in this case, the embodiment corresponds with the second use case described with reference to FIG. 4). FIG. 8 shows that there are six tokens (numbered 0-5) corresponding to the elements: dblp, article, title, date, author and thesis. Each of these tokens have corresponding user role map entry, in this case there being two roles: "see all" and "see only articles". As can be noted from FIG. 8, the latter effectively excludes theseis, the subject of token 5.

The output of the process 86 is a reduced domain tree 88. The domain tree 84 is reduced on the basis of user role map. For example, if it is known that the intended recipient of the example XML document cannot see any entry corresponding to 'thesis', then all entries for 'thesis' are removed from the domain tree. The remaining elements of the tree are now available to be compressed and encrypted.

A path processor 90 receives the reduced domain tree 88. The path processor 90 serves to separate the reduced domain tree 88 into separate structure and content components.

Separating Structure

Taking the structure component firstly, the path processor 90 generates a path summary for each element in the XML document and separates it from the data of that element. A path summary for an element is the path of this element from the root of the document.

Figure 9:
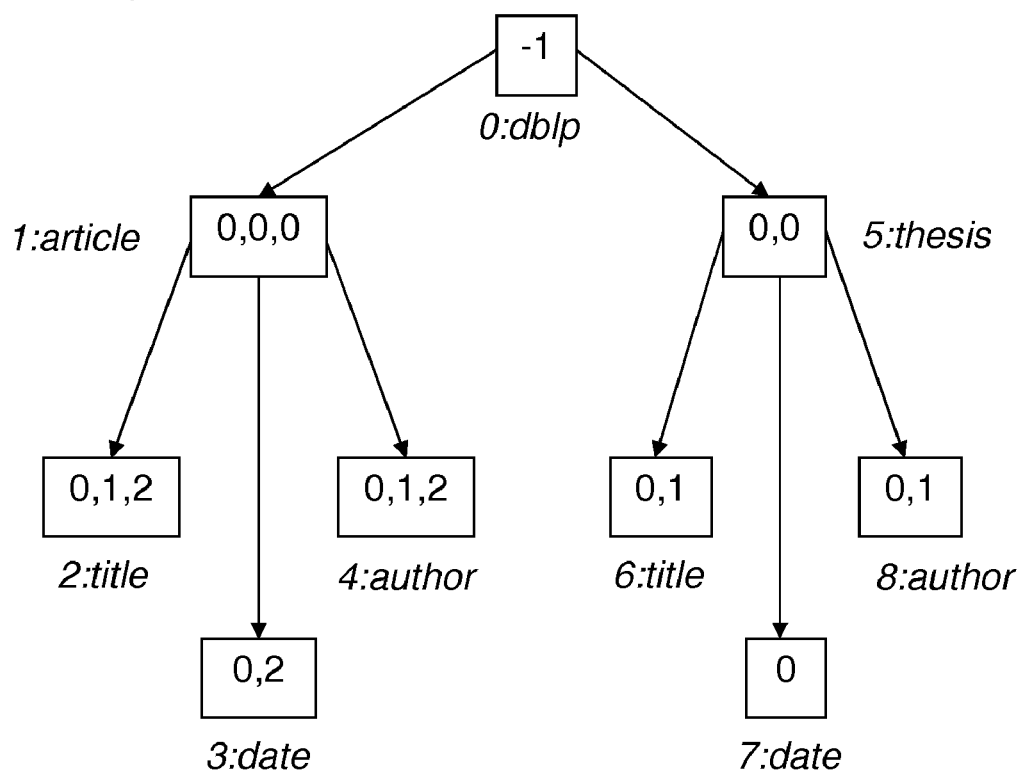
FIG. 9 shows a C tree for the example XML document.

The structure component 91 is subjected to a C tree extractor 92 to generate a C tree 94 as shown in FIG. 9. A C tree is a two-level tree which provides a concise structure summary at its group level and detailed child-parent links at its element level which can provide fast access to elements' parents. From FIG. 9, it can be seen that 'date' is missing in the second article (because 0 corresponds to first article, 2 corresponds to third article, a missing '1' indicates missing date in the second article). In this context, date 0 is the child for the first article, date 2 is the child for third article. There is no child for the second article. Going further up in the tree, all three articles are children of the only "dblp" element existing (numbering starts with 0).

Next, a $C^+$ tree extractor 96 operates on the C tree to generate an output $C^+$ tree 98, representing the structure of the source XML file 80. The $C^+$ extractor 96 can operate in either of two modes. The first mode is to be 'order-preserving', and the second mode allows for re-ordering of input elements. The order-preserving approach associates a node number with each element in the domain tree 84 and maintains this information. The re-ordering approach contains only relative parent knowledge. In the original XML document, elements occur in certain order. For example, in the example input XML document shown in FIG. 7, an article appears followed by two thesis items and then two article items again. In an order-preserving approach, the same ordering is used—articles are given the numbering 1, 4 and 5 while thesis items are given the numbers 2 and 3. In a re-ordering approach, this information isn't kept.

Figure 10A:
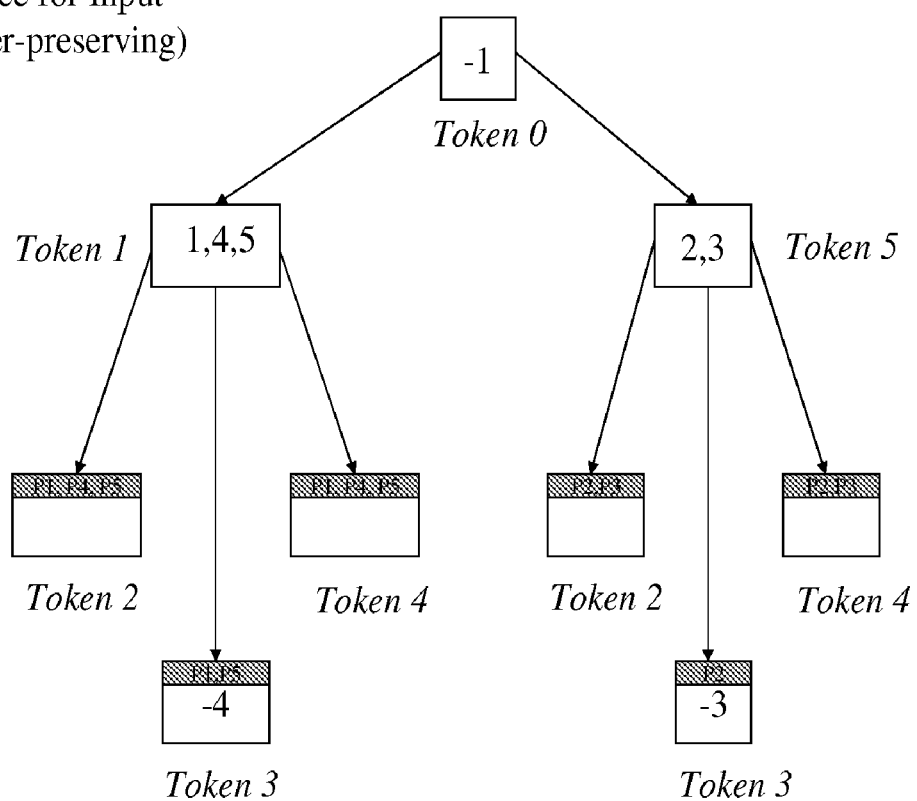
FIGS. 10A and 10B show resultant $C^+$ Trees for the example XML document.
Figure 10B:
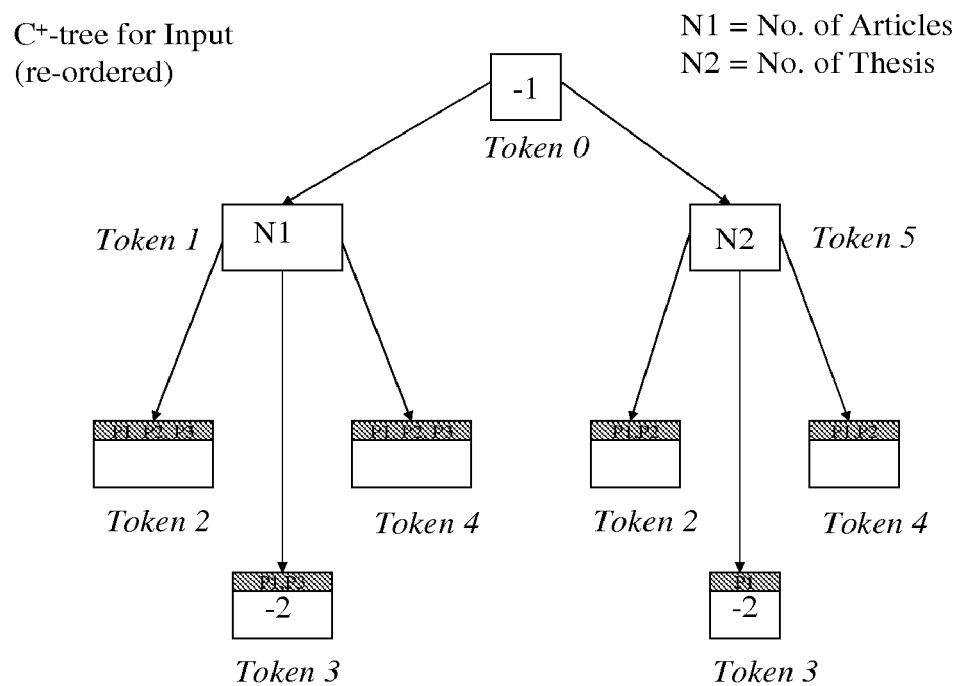

FIGS. 10A and 10B are examples of $C^+$ trees for the input XML document represented in a tree format in FIG. 7.

FIG. 10A represents the order-preserving approach, whereas FIG. 10B represents the re-ordering approach. A $C^+$ tree is like a C tree with the exception that instead of keeping information about children of parents which are present, it maintains information about the children which are absent. For example, from FIG. 10A, it can be seen that nodes numbered 1, 4 and 5 are node numbers for the three articles (in the domain tree for the XML document) whereas 2 and 3 are the node numbers for the thesis items in the XML document. The presence of '−4' in the node for the date (indicated by Token 3) states the information that article whose node number is 4 does not have any date. Compare this to the C tree of FIG. 9 which contains information about the 'present' children. In a $C^+$ tree, information about which children are 'missing' is stored. In FIG. 10B, N1 indicates node for articles, and N2 indicates a node for thesis. The relative ordering of articles and thesis in the original document is not retained.

Content Separation

The reduced DOM tree 88 is a subset of the DOM tree 84, taking into account the Schema Token and the User Role Map. In a DOM tree, the path of a node with respect to the root determines its position in the original XML document (structure), while the value stored in that node corresponds to the content. The content portion 93 is passed to a data duplication removal process 100.

To improve compression, only unique values in the content portion 93 are stored. Therefore, the data duplication removal process 100 keeps only one copy of repeating content values. Thus, if two bibliographic entries have the same author, we will store the author name only once in the content portion 93. The thus generated distinctive content 102 is generated. FIG. 11 shows the distinctive content 102 for the XML file 80 in question.

The $C^+$ tree 98 and the distinctive content 102 are passed to an encryption process 104, implementing the well-known RSA algorithm. The $C^+$ tree 98 and distinctive content 102 are encrypted separately, by the encryption process 104 resulting in an encrypted $C^+$ tree 106 and encrypted distinctive content 108.

The encrypted distinctive content 108 is the subject of a Huffman compression process 110, which generates compressed content data 112 and a related Huffman tree 114. As will be apparent, $C^+$ tree information 106 is not compressed. In another embodiment it may be useful or desirable to compress the structural information.

Figure 12:
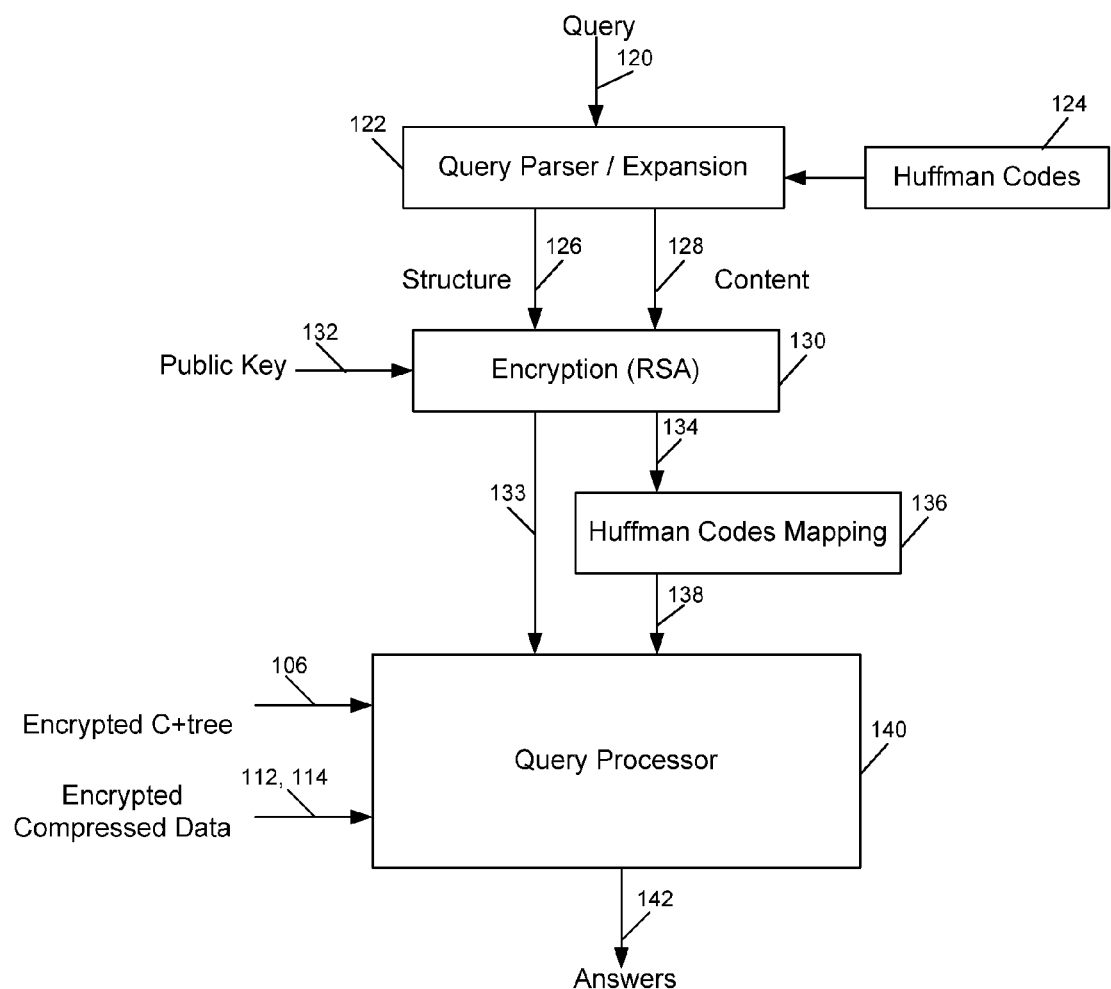
FIG. 12 is a schematic block flow diagram of an example query handling process.

FIG. 12 shows a specific example of query handling. A query 120 is received by a query parser, to be expanded by the application of a set of Huffman codes 124. This then generates the structure component of the query 126 and the content component of the query 128. Thus query structure 126 and query content 128 are then passed to an encryption process 130 that utilises a public key 132, to generate encrypted query structure 132 and encrypted query content 134. The encrypted query content 134 is passed to a Huffman code mapping process 136 to generate the fully compressed query content 138. A query processor 140 takes the query structure 132 and the query content 138 and operates on the encrypted $C^+$ tree data 106 and the encrypted compressed data 112, 114 to generate the query answer 142.

The query structure is used to determine the content to match in the (compressed and/or encrypted) XML, and then this content is matched to the one in the query to generate our response. The following are the main steps:

Step 1: Assume compressed and encrypted XML document D; query is Q

Step 2: Extract data 'd', structure 's' from Q

Step 3: Compress and encrypt 'd' to get 'd+', 's' to get 's+'

Step 4: Determine the content in D whose structure matches with 's+'

Step 5: Match this content in D to 'd+' to generate the query response

The operations for match and extract are defined in any suitable standard XML query language like XML Query.

Discussion

The ultimate goal when querying XML data is to avoid any decryption or decompression. Having XML data encrypted and compressed implies that some preprocessing over the query has to be done before applying the matching process. The query should be encrypted and compressed; it will then be examined against the XML data (as indicated in FIG. 12).

FIG. 12 indicates a query will be reformulated, first by expanding it to an equivalent group of exact queries (if possible). Then the query will be parsed in order to obtain its structure and contents. Both structure and contents will be encrypted via RSA, and then the encrypted contents will be compressed using Huffman. It is important to note that, for exact queries there is no need to decompress or decrypt the data. But for range queries, if the range cannot be mapped to a limited number of exact values, the data must be decrypted and decompressed. However, even in this case the whole document will not be decompressed and decrypted, only the groups that fall under the query scope.

Computer Platform

Figure 13:
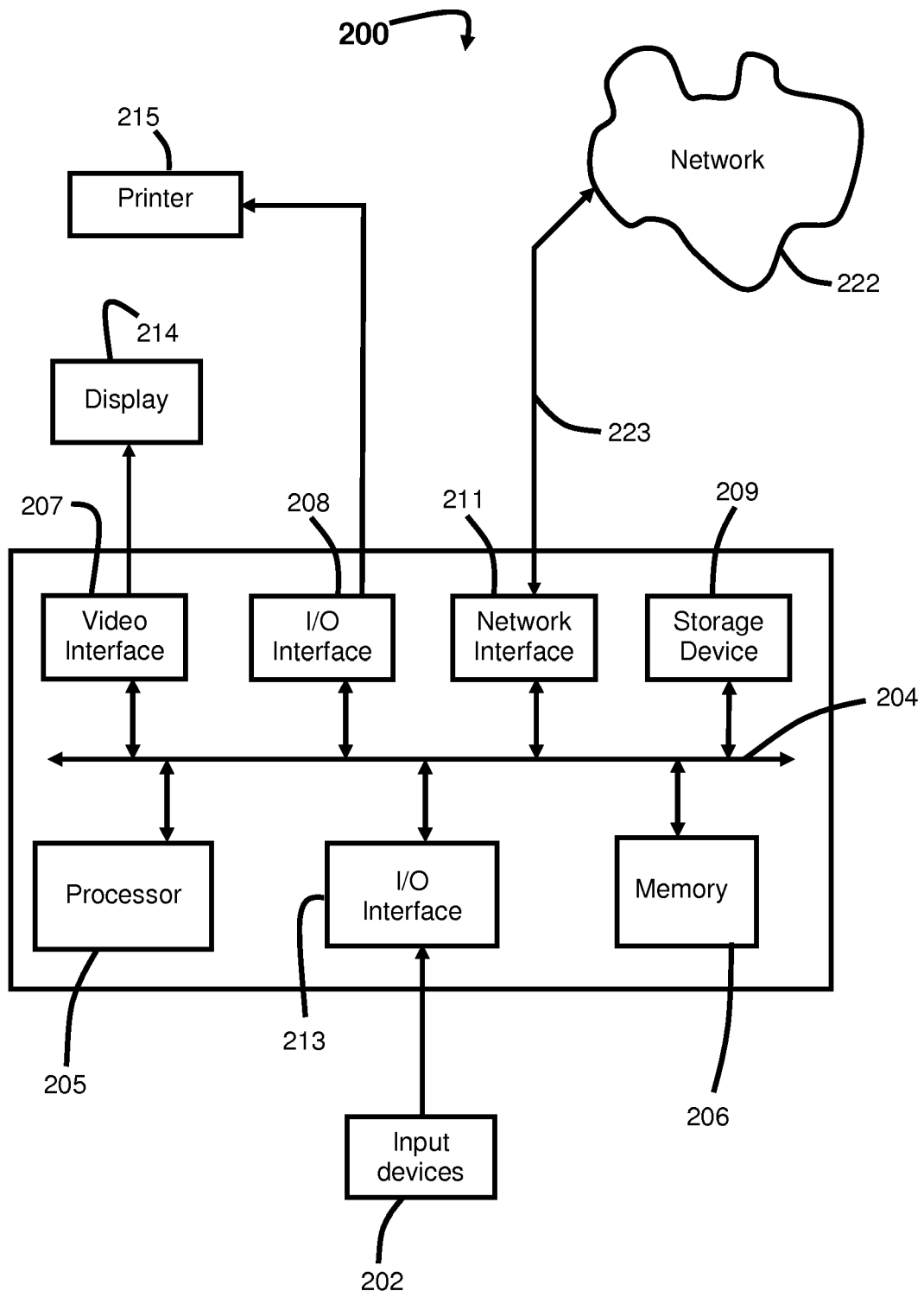
FIG. 13 is a schematic block diagram of a computer system that can be used to implement the generator, architecture and method of FIGS. 1 to 3.

FIG. 13 shows a schematic block diagram of a computer system 200 that can be used to practice the methods described herein. More specifically, the computer system 200 is provided for executing computer software that is programmed to compress and optionally encrypt hierarchical text data, and to handle query processing. The computer software executes under an operating system such as MS Windows 2000, MS Windows XP™ or Linux™ installed on the computer system 200.

The computer software involves a set of programmed logic instructions that may be executed by the computer system 200 for instructing the computer system 200 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code, that perform particular steps of the methods described hereinbefore.

The components of the computer system 200 comprise: a computer 201, input devices 202 and a video display 214. The computer 201 comprises: a processing unit 205, a memory unit 206, an input/output (I/O) interface 208, a network interface 211, a video interface 207, and a storage device 209. The computer 201 may comprise more than one of any of the foregoing units, interfaces, and devices.

The processing unit 205 may comprise one or more processors that execute the operating system and the computer software executing under the operating system. The memory unit 206 may comprise random access memory (RAM), read-only memory (ROM), flash memory and/or any other type of memory known in the art for use under direction of the processing unit 205.

The video interface 207 is connected to the video display 214 and provides video signals for display on the video display 214. User input to operate the computer 201 is provided via the input devices 202, comprising a keyboard and a mouse, respectively. The storage device 206 may comprise a disk drive or any other suitable non-volatile storage medium.

Each of the components of the computer 201 is connected to a bus 204 that comprises data, address, and control buses, to allow the components to communicate with each other via the bus 204.

The computer system 200 may be connected to one or more other similar computers via the network interface 211 using a communication channel 223 to a network 222.

The computer software program may be provided as a computer program product, and recorded on a portable storage medium. In this case, the computer software program is accessible by the computer system 200 from the storage device 206. Alternatively, the computer software may be accessible directly from the network 222 by the computer 201. In either case, a user can interact with the computer system 200 using a keyboard and a mouse to operate the programmed computer software executing on the computer 201.

The computer system 200 has been described for illustrative purposes. Accordingly, the foregoing description relates to an example of a particular type of computer system such as a personal computer (PC), which is suitable for practicing the methods and computer program products described hereinbefore. Those skilled in the computer programming arts would readily appreciate that alternative configurations or types of computer systems may be used to practice the methods and computer program products described hereinbefore.

Embodiments of methods, systems and computer program products have been described hereinbefore relating to the comparison of standard and deployed program code to generate code change descriptions. The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

We claim:

1. A computer implemented method of generating a queriable hierarchical text, comprising:
   inputting a source hierarchical text to a computer;
   adding schema tokens to said source hierarchical text using said computer,
     wherein said schema tokens identify a mapping between elements of said source hierarchical text and corresponding tokens;
   applying user role mapping to said source hierarchical text, wherein said user role mapping maps said corresponding tokens, compatible with a user role, to said source hierarchical text;
   separating said user role mapped source hierarchical text into a structure component and a content component using said computer;
   generating a C tree based tree structure from said structure component using said computer, the C tree based structure associated with a concise structure summary at a group level and detailed child-parent links at the element level;
   generating a C+ tree based tree structure based on said C tree structure using said computer; and
   compressing said content component using said computer to provide a compressed, user role mapped content component that is queriable by a compressed query.

2. The computer implemented method of claim 1, wherein said source hierarchical text is represented as a domain tree having paths and nodes storing values, and said separating includes generating a path summary independent of said values of said compressed, user role mapped source hierarchical text.

3. The computer implemented method of claim 2, wherein said C+ based tree structure representation includes information associating each node number in the tree with an element position in the source hierarchical text.

4. The computer implemented method of claim 2, wherein said C+ based tree structure representation includes information only about relative parent nodes.

5. The computer implemented method of claim 1, further comprising:
encrypting said structure component using said computer; and
encrypting said content component before performing said compressing using said computer.

6. The computer implemented method of claim 5, wherein said structure component is compressed.

7. An apparatus for generating a queriable hierarchical text, said apparatus comprising:
a processor that:
adds schema tokens to said source hierarchical text,
wherein said schema tokens identify a mapping between elements of said source hierarchical text and corresponding tokens;
applies user role mapping to said source hierarchical text,
wherein said user role mapping maps said corresponding tokens, compatible with a user role, to said source hierarchical text;
separates said user role mapped source hierarchical text into a structure component and a content component;
generates a C tree based tree structure from said structure component, the C tree based structure associated with a concise structure summary at a group level and detailed child-parent links at the element level;
generates a C+ tree based tree structure based on said C tree structure; and
compresses said content component to provide a compressed, user role mapped content component that is queriable by a compressed query; and
a memory that stores said mapping of said schema tokens and said user role mapping.

8. The apparatus of claim 7, wherein said source text is represented as a domain tree having paths and nodes storing values, and said processor generates a path summary independent of said values of said compressed, user role mapped source hierarchical text.

9. The apparatus of claim 8, wherein said C+ based tree structure representation includes information associating each node number in the tree with an element position in the source hierarchical text.

10. The apparatus of claim 8, wherein said C+ based tree structure representation includes information only about relative parent nodes.

11. The apparatus of claim 7, wherein said processor further encrypts said structure component, and encrypts said content component before performing said compression.

12. A program storage medium readable by machine, tangibly embodying a program of instructions executable by said machine to perform a method of generating a queriable hierarchical text, said method comprising:
inputting a source hierarchical text;
adding schema tokens to said source hierarchical text,
wherein said schema tokens identify a mapping between elements of said source hierarchical text and corresponding tokens;
applying user role mapping to said source hierarchical text,
wherein said user role mapping maps said corresponding tokens, compatible with a user role, to said source hierarchical text;
separating said user role mapped source hierarchical text into a structure component and a content component;
generating a C tree based tree structure from said structure component, the C tree based structure associated with a concise structure summary at a group level and detailed child-parent links at the element level;
generating a C+ tree based tree structure based on said C tree structure; and
compressing said content component to provide a compressed, user role mapped content component that is queriable by a compressed query.

13. A computer-implemented method for processing a compressed query of an intermediate form, said method comprising:
inputting a source hierarchical text to a computer;
adding schema tokens to said source hierarchical text using said computer,
wherein said schema tokens identify a mapping between elements of said source hierarchical text and corresponding tokens;
applying user role mapping to said source hierarchical text,
wherein said user role mapping maps said corresponding tokens, compatible with a user role, to said source hierarchical text;
separating said user role mapped source hierarchical text into a structure component and a content component using said computer;
generating a C tree based tree structure from said structure component using said computer, the C tree based structure associated with a concise structure summary at a group level and detailed child-parent links at the element level;
generating a C+ tree based tree structure based on said C tree structure using said computer;
compressing said content component to provide a compressed, user role mapped content component that is queriable by said compressed query using said computer;
inputting said compressed query of said intermediate form for said compressed, user role mapped content component using said computer;
determining relevant content in said compressed, user role mapped content component using said computer; and
outputting a compressed query response by matching said relevant content to said compressed, user role mapped content component corresponding to said user role using said computer.

14. A computer-implemented method for processing a query of an original form, said method comprising:
inputting a source hierarchical text using a computer;
adding schema tokens to said source hierarchical text using said computer,
wherein said schema tokens identify a mapping between elements of said source hierarchical text and corresponding tokens;
applying user role mapping to said source hierarchical text using said computer,
wherein said user role mapping maps said corresponding tokens, compatible with a user role, to said source hierarchical text;
separating said user role mapped source hierarchical text into a structure component and a content component using said computer;

generating a C tree based tree structure from said structure component using said computer, the C tree based structure associated with a concise structure summary at a group level and detailed child-parent links at the element level;

generating a C+ tree based tree structure based on said C tree structure using said computer;

compressing said content component to provide a compressed, user role mapped content component using said computer;

inputting said query of said original form using said computer;

adding schema tokens to said query using said computer, wherein said schema tokens identify a mapping between elements of said query and corresponding tokens;

applying user role mapping to said query using said computer,
wherein said user role mapping maps said corresponding tokens, compatible with a user role, to said query;

compressing said query to provide a compressed, user role mapped query using said computer;

querying said compressed, user role mapped content component using said computer;

determining relevant content in said compressed, user role mapped content component using said computer;

outputting a compressed query response by matching said relevant content to said compressed, user role mapped content component corresponding to said user role using said computer; and decompressing said compressed query response using said computer to provide a query result of said original form corresponding to said user role.

15. The method of claim 14, further comprising encrypting said compressed, user role mapped query and said compressed, user role mapped content component using said computer.

* * * * *